United States Patent [19]

Wenski et al.

[11] Patent Number: 5,009,934

[45] Date of Patent: Apr. 23, 1991

[54] PROCESS FOR PREPARING POLY-(IMIDESILOXANES)

[75] Inventors: Guido Wenski, Munich; Ludwig Maier, Eggenfelden; Franz-Heinrich Kreuzer, Martinsried, all of Fed. Rep. of Germany

[73] Assignee: Wacker-Chemie GmbH, Munich, Fed. Rep. of Germany

[21] Appl. No.: 549,586

[22] Filed: Jul. 6, 1990

[30] Foreign Application Priority Data

Jul. 28, 1989 [DE] Fed. Rep. of Germany ....... 3925099

[51] Int. Cl.$^5$ .............................................. B05D 3/02
[52] U.S. Cl. ...................................... 427/387; 528/27; 528/28; 528/31; 528/15; 528/26
[58] Field of Search ....................... 528/27, 28, 26, 31, 528/15; 427/387

[56] References Cited

U.S. PATENT DOCUMENTS 4,795,680 1/1989 Rich et al. ............................. 528/26
4,853,452 8/1989 Lee ....................................... 528/26

Primary Examiner—Melvyn I. Marquis

[57] ABSTRACT

A process for preparing poly-(imidesiloxanes) which comprises reacting an N,N'-dialkenyldiimide with an organosilicon compound containing two Si-bonded hydrogen atoms in the presence of a catalyst which promotes the addition of Si-bonded hydrogen to an aliphatic multiple bond.

13 Claims, No Drawings

PROCESS FOR PREPARING POLY-(IMIDESILOXANES)

The present invention relates to a process for preparing poly-(imidesiloxanes) and more particularly to a process for preparing poly-(imidesiloxanes) by hydrosilylation of an N,N'-dialkenyldiimide with an organosilicon compound containing Si-bonded hydrogen.

BACKGROUND OF THE INVENTION

Poly-(imidesiloxanes) are of particular interest because, like polyimides, they have outstanding thermal and mechanical properties, but are more soluble and more easily processed than polyimides.

Processes for the preparation of poly-(imidesiloxanes) are already known. For example, U.S. Pat. No. 3,274,155 (F. C. Saunders, Midland Silicones Limited) describes the preparation of poly-(imidesiloxanes) from pyromellitic dianhydride, and U.S. Pat. No. 3,325,450 (F. F. Holub, General Electric Company) describes the preparation of poly-(imidesiloxanes) from benzophenonetetracarboxylic dianhydride. Both of these patents describe the preparation of poly-(imidesiloxanes) by polycondensation with fairly long-chain $\alpha,\omega$-bisaminoalkylsiloxanes.

A polycondensation of this type is the most widely used method for preparing poly-(imidesiloxanes). In this connection reference should also be made, for example, to U.S. Pat. No. 4,011,279 (A. Berger, General Electric Company), European Application 54,426 (A. Berger, M&T Chemicals Inc.), U.S. Pat. No. 4,395,527 (A. Berger, M&T Chemicals Inc.) and Japanese Publication 62,227,953 (Yoshida Masatoshi, Hitachi Chemical Co. Ltd.).

In the preparation of poly-(imidesiloxanes) by these processes tetracarboxylic dianhydrides are first condensed with $\alpha,\omega$-bisaminoalkylsiloxanes to form polyamic acids, which are imidized at an elevated temperature.

Another method of preparing poly-(imidesiloxanes) is described in U.S. Pat. No. 4,404,350 (Hong-Son Ryang, General Electric Company), U.S. Pat. No. 4,794,153 (J. D. Rich, General Electric Company) and the corresponding German Offenlegungsschrift 3,618,714, and U.S. Pat. No. 4,795,680 (J. D. Rich, General Electric Company) and the corresponding German Offenlegungsschrift 3,803,088. These processes relate to the condensation of anhydride-siloxanes with organic diamines to give polyamic acids, which then also have to be imidized.

Therefore it is an object of the present invention to provide a process for preparing poly-(imidesiloxanes) in a relatively simple manner and without undesirable side reactions and in which high conversions are achieved in short reaction times.

SUMMARY OF THE INVENTION

The foregoing objects and others which will become apparent from the following description are accomplished in accordance with this invention, generally speaking, by providing a process for preparing poly(imidesiloxanes) which comprises reacting an N,N'-dialkenyldiimide with an organosilicon compound containing two Si-bonded hydrogen atoms in the presence of a catalyst which promotes the addition of Si-bonded hydrogen to an aliphatic multiple bond.

DESCRIPTION OF THE INVENTION

The N,N'-dialkenyldiimide employed in accordance with this invention is preferably a compound of the general formula

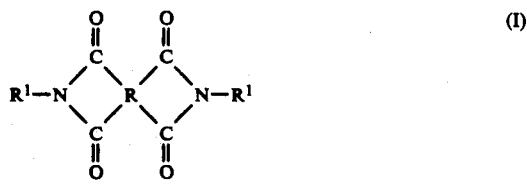

in which R represents a tetravalent organic radical free from an aliphatic multiple bond and $R^1$ represents the same or different monovalent organic radicals having an aliphatic carbon-carbon double bond.

Preferred radicals represented by R are tetravalent aromatic radicals, preferably tetravalent aromatic radicals having from 6 to 20 carbon atoms, such as, for example, the benzene, naphthalene, biphenyl and benzophenone radical.

Preferred radicals represented by $R^1$ are monovalent organic radicals having a terminal aliphatic carbon-carbon double bond. Examples of radicals represented by $R^1$ are $\omega$-alkenyl groups, such as allyl and 3-butenyl groups, allylcycloalkyl radicals, such as the 2-allylcyclohexyl radical, and $\omega$-alkenylaryl radicals, such as the 4-vinylphenyl and 4-allylphenyl radicals. Preferred $R^1$ radicals are those of the formula

$$H_2C=CH-(CH_2)_m-,$$

in which m is 1 to 4.

The term poly-(imidesiloxanes) as used herein is meant to include polymers containing silanes and silacarbanes as silicon-functional units.

The N,N'-dialkenyldiimides employed in accordance with this invention can be prepared by processes known per se, such as, for example, by reacting the corresponding tetracarboxylic anhydride of the general formula

with an alkenylamine of the formula

$$R^1NH_2 \qquad (III)$$

in the presence of boiling dimethylformamide, where R and $R^1$ are the same as above. In this regard, reference should be made, for example, to U.S. Pat. No. 4,212,880 (M. H. Fisher, Merck & Co. Inc).

The following are examples of the tetracarboxylic anhydrides used in the preparation of the N,N'-dialkenyldiimides which are employed in accordance with this invention:
Pyromellitic dianhydride
3,3',4,4'-benzophenonetetracarboxylic dianhydride
2,3,3',4'-benzophenonetetracarboxylic dianhydride
2,2',3,3'-benzophenonetetracarboxylic dianhydride
1,4,5,8-naphthalenetetracarboxylic dianhydride 1,2,5,6-naphthalenetetracarboxylic dianhydride
2,3,6,7-naphthalenetetracarboxylic dianhydride
3,3',4,4'-biphenyltetracarboxylic dianhydride
2,2',3,3'-biphenyltetracarboxylic dianhydride
2,3,3',4'-biphenyltetracarboxylic dianhydride
4,4',5,5'-bisnaphthalenetetracarboxylic dianhydride
3,4,9,10-perylenetetracarboxylic dianhydride
bis-(3,4-dicarboxyphenyl) ether dianhydride
bis-(3,4-dicarboxyphenyl) sulfone dianhydride.

Examples of the alkenylamines used in the preparation of the N,N'-dialkenyldiimides employed in accordance with this invention are allylamine, 3-butenylamine, 4-pentenylamine, 5-hexenylamine, 2-allylcyclohexylamine, 4-allylaniline and 4-vinylaniline.

The tetracarboxylic anhydrides and alkenylamines used in the preparation of the N,N'-dialkenyldiimides which are employed in accordance with this invention are commercially available products or can be prepared by methods known in organic chemistry [cf., for example, Deutsche Chemische Gesellschaft, "Beilsteins Handbuch der organischen Chemie" ("Beilstein's Handbook of Organic Chemistry"), Springer, Berlin, 4th edition, 1934, volume XIX and Houben-Weyl, "Methoden der organischen Chemie" ("Methods of Organic Chemistry"), Georg Thieme, Stuttgart, 4th edition, 1957, volume XI/1].

The N,N'-dialkenyldiimides which are preferable employed in the process of this invention are N,N'-diallylpyromellitic diimide, N,N'-diallyl-3,3',4,4'-benzophenonetetracarboxylic diimide, N,N'-diallyl-1,4,5,8-naphthalenetetracarboxylic diimide, N,N'-diallyl2,2',3,3'-biphenyltetracarboxylic diimide, N,N'-di-3-butenyl-3,3',4,4'-benzophenonetetracarboxylic diimide, N,N-di-3-butenyl-1,4',5,8'-naphthalenetetracarboxylic diimide, N,N'-di-5-hexenylpyromellitic diimide, N,N'-di-5-hexenyl-1,4,5,8-naphthalenetetracarboxylic diimide.

The N,N'-dialkenyldiimide employed in accordance with this invention can be an individual type of N,N'-dialkenyldiimide. However, it can also be a mixture of at least two different types of such N,N'-dialkenyldiimides.

The organosilicon compound containing two Si-bonded hydrogen atoms which is employed in accordance with this invention and which can be linear, branched or cyclic, is preferably a compound having units of the general formula

   (IV)

in which $R^2$ represents the same or different monovalent SiC-bonded organic radicals which are free from an aliphatic multiple bond, and substituted, monovalent SiC-bonded organic radicals which are free from an aliphatic multiple bond, $R^3$ can be the same or different and represents an oxygen atom or divalent, SiC-bonded organic radicals which are free from an aliphatic multiple bond and divalent substituted SiC-bonded organic radicals which are free from an aliphatic multiple bond and a is 0, 1 or 2, with an average of from 0.01 to 1, preferable with an average of from 0.10 to 0.67, b is 0, 1, 2 or 3, with an average of from 1.5 to 2.5 and more preferably an average of 2, and the sum of a and b is less than or equal to 3, with the proviso that two Si-bonded hydrogen atoms are present per molecule.

The radicals represented by $R^2$ are preferably hydrocarbon radicals having from 1 to 12 carbon atom(s).

Examples of radicals represented by $R^2$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, and dodecyl radicals, such as the n-dodecyl radical; cycloalkyl radicals, such as the cyclopentyl, cyclohexyl, cycloheptyl and methylcyclohexyl radicals; aryl radicals, such as the phenyl radical and the naphthyl radical; alkaryl radicals, such as o-, m- or p-tolyl radicals, xylyl radicals and ethylphenyl radicals, and aralkyl radicals, such as the benzyl radical, the α-phenylethyl radical and the β-phenylethyl radical.

Examples of substituted radicals represented by $R^2$ are cyanoalkyl radicals, such as the -cyanoethyl radical, and halogenated hydrocarbon radicals, for example halogenoalkyl radicals, such as the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radical.

Radicals represented by $R^2$ which are particularly preferred are the methyl, ethyl, n-propyl, isooctyl and phenyl radical.

The radicals represented by $R^3$ are preferably the oxygen atom.

If, however, the radical represented by $R^3$ is a divalent, SiC-bonded radical, then hydrocarbon radicals having from 1 to 30 carbon atom(s) which can be substituted by ether oxygen atoms, such as, for example, oligooxymethylene or oligooxyethylene groups, are preferred.

Examples of radicals represented by $R^3$ are alkylene radicals, such as the methylene, ethylene, n-propylene, isopropylene, 1-n-butylene, 2-n-butylene, isobutylene, tert-butylene, n-pentylene, isopentylene, neopentylene, tert-pentylene radical, hexylene radicals, such as the n-hexylene radical, heptylene radicals, such as the n-heptylene radical, octylene radicals, such as the n-octylene radical, and isooctylene radicals, such as the 2,2,4-trimethylpentylene radical, nonylene radicals, such as the n-nonylene radical, decylene radicals, such as the n-decylene radical, dodecylene radicals, such as the n-dodecylene radical, and octadecylene radicals, such as the n-octadecylene radical; cycloalkylene radicals, such as cyclopentylene, cyclohexylene, cycloheptylene and methyl cyclohexylene radicals; arylene radicals, such as the phenylene, naphthylene, anthrylene and phenanthrylene radical; alkarylene radicals, such as o-, m- and p-tolylene radicals, xylylene radicals and ethylphenylene radicals; and aralkylene radicals, such as the benzylene radical, the α-phenylethylene radical and the β-phenylethylene radical.

Examples of substituted radicals represented by $R^3$ are cyanoalkylene radicals, such as the β-cyanoethylene radical, and halogenated hydrocarbon radicals, for example halogenoalkylene radicals, such as the 3,3,3-trifluoro-n-propylene radical, the 2,2,2,2',2',2'-hexafluoroisopropylene radical and the heptafluoroisopropylene radical, and halogenoarylene radicals, such as the o-, m- and p-chlorophenylene radical.

The viscosity of the organosilicon compound containing two Si-bonded hydrogen atoms which is employed in the process of this invention is preferably between 0.5 and 200 mm²/s, and more preferably between 1 and 20 mm²/s.

The following are examples of the organosilicon compound containing two Si-bonded hydrogen atoms which is employed in the process of this invention H—[Si(CH$_3$)$_2$—O]$_4$—Si(CH$_3$)$_2$—H
H—[Si(CH$_3$)$_2$—O]$_9$—Si(CH$_3$)$_2$—H
H—Si(CH$_3$)$_2$—O—[Si(CH$_3$)(C$_6$H$_5$)—O]$_{15}$—Si(CH$_3$)$_2$—H
H—Si(CH$_3$)$_2$—O—[Si(CH$_3$)(C$_8$H$_{17}$)—O]$_{18}$—Si(CH$_3$)$_2$—H
H—Si(CH$_3$)$_2$—O—[Si(C$_2$H$_5$)$_2$—O]$_{10}$—Si(CH$_3$)$_2$—H
H—Si(CH$_3$)$_2$—O—([Si(CH$_3$)$_2$—O][Si(CH$_3$)(C$_6$H$_5$)—O])$_8$—Si(CH$_3$)$_2$—H

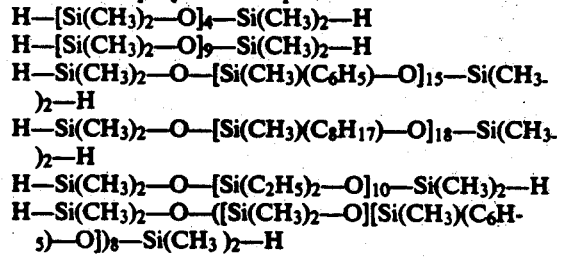

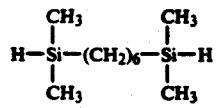

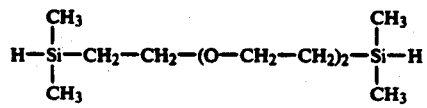

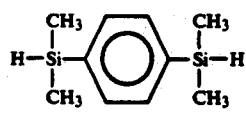

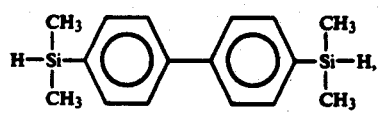

in which CH$_3$ represents the methyl, C$_2$H$_5$ the ethyl, C$_6$H$_5$ the phenyl and C$_8$H$_{17}$ the isooctyl radical. α,ω-Dihydrogenorgano(poly)siloxanes, particularly α,ω-dihydrogendimethyl(poly)siloxanes having from 3 to 20 silicon atoms per molecule, are preferably employed in the process of this invention as the organosilicon compound having two Si-bonded hydrogen atoms.

The organosilicon compounds having two Sibonded hydrogen atoms which are employed in this invention are commercially available products or can be prepared by methods generally known in silicon chemistry. In this connection reference should be made, for example, to W. Noll, "Chemistry and Technology of Silicones", Academic Press, Orlando, 1968, pages 191 et seq. and to M. Wick, G. Kreis, F.-H. Kreuzer, "Silicone" ("silicones"), in "Ullmanns Encyklopädie der technischen Chemie" ("Ullmann's Encyclopedia of Technical Chemistry"), Verlag Chemie, Weinheim, 4th edition, 1982, volume 21, pages 511 et seq.

For example, α,ω-dihydrogendiorgano(poly)siloxanes can be prepared by cationic polymerization of octaorganocyclotetrasiloxanes in the presence of 1,3-dihydrogentetraorganodisiloxane or by equilibration of α,ω-dihydroxydiorganopolysiloxanes with a 1,3-dihydrogentetraorganodisiloxane in the presence of acid catalysts, such as PNCl$_2$.

The organosilicon compound having two Si-bonded hydrogen atoms which is employed in accordance with this invention can be an individual type of organosilicon compound having two Si-bonded hydrogen atoms. However, it can also be a mixture of at least two different types of such organosilicon compounds.

In the process of this invention, the molar ratio of N,N'-dialkenyldiimide to organosilicon compound having two Si-bonded hydrogen atoms in the molecule is preferably between 1:0.7 and 1:1.3, and more preferably between 1:0.95 and 1:1.05, and especially 1:1. If the molar ratio of N,N'-dialkenyldiimide to organosilicon compound having two Si-bonded hydrogen atoms deviates substantially from 1:1, such as, for example, 1:1.5 or 1:0.5, so-called prepolymers containing end groups, of the component employed in excess are obtained.

Within the scope of the process of this invention, the catalysts employed can be the same as those which have also been employed heretofore for the addition of Si-bonded hydrogen atoms to aliphatic multiple bonds. These are mainly metals of the 8th subgroup and inorganic and organic compounds thereof, in which platinum and its compounds are preferred.

Examples of such catalysts are finely divided elementary platinum deposited on an inert support, such as active charcoal, SiO$_2$ or Al$_2$O$_3$, in accordance with U.S. Pat. No. 2,970,150 (D. L. Bailey, Union Carbide Corporation), hexachloroplatinic acid in accordance with U.S. Pat. No. 2,823,218 (J. L. Speier, Dow Corning Corporation) and chloroplatinates derived therefrom, platinum complexes of the type L.PtCl$_2$ in which L represents a linear or cyclic monoolefin, such as ethylene, propylene and cyclohexylene, in accordance with U.S. Pat. No. 3,159,601 and U.S. Pat. No. 3,159,662 (Bruce A. Ashby, General Electric Company), platinum complexes of the type L.PtCl$_2$ in which L represents a cyclic diolefin, such as 1,5-cyclooctadiene, norbornadiene and cyclopentadiene, in accordance with Japanese Published Specification 79/76,529 and Japanese Published Specification 79/76,530 (Masatoshi Arai, Shin-Etsu Chemical Industry Co., Ltd.) and U.S. Pat. No. 4,276,252 (G. Kreis, Wacker-Chemie GmbH) or represents a cyclic polyolefin in accordance with German Application P 3,906,514.6 (G. Wenski, Consortium für elektrochemische Industrie GmbH), platinum vinylsiloxane complexes in accordance with U.S. Pat. No. 3,814,730 (B. D. Karstedt, General Electric Company) and acetylacetonate complexes of platinum in accordance with U.S. Pat. No. 4,177,341 (G. Kreis, Consortium für elektrochemische Industrie GmbH).

Owing to their high activity, platinum complexes of the type L.PtCl$_2$ in which L represents a cyclic diolefin or polyolefin, in particular dicyclopentadiene platinum dichloride, are preferably employed in the process of this invention.

The catalyst employed in accordance with this invention can be an individual type of catalyst or a mixture of at least two different types of such catalysts.

The amount of catalyst employed in the process of this invention can be the same as used in the processes known heretofore for the addition of Si-bonded hydrogen to an aliphatic multiple bond in the presence of a catalyst. These are preferably from 0.1 to 1,000 parts by weight per million, calculated as elementary platinum, based on the total weight of the reaction mass. In the case of platinum complexes of the type L.PtCl$_2$ in which L represents a cyclic diolefin or polyolefin, especially dicyclopentadiene platinum dichloride, as the catalyst, concentrations of from 20 to 100 parts by weight per million, calculated as elementary platinum, based on the total weight of the reaction mass are sufficient.

The process of this invention can be carried out in the presence or absence of a solvent, preferably in the presence of an organic solvent which is inert with respect to the reactants and reaction products and in particular a solvent in which the poly-(imidesiloxane) prepared in accordance with this invention is at least partially and more preferably completely, soluble.

Examples of solvents are alcohols, such as methanol, ethanol, n-propanol, isopropanol, n-, sec- and tert-butanol and 2-butanol; esters, such as methyl acetate, ethyl acetate, n-propyl and isopropyl acetate, n-, sec- and tert-butyl acetate, ethyl formate and diethyl carbonate; ethers, such as dioxane, tetrahydrofuran, diethyl ether, di-n-propyl ether, diisopropyl ether, di-n-butyl ether and anisole; chlorinated hydrocarbons, such as methylene dichloride, chloroform, carbon tetrachloride, 1,2-dichloroethane, 1,1,1-trichloroethane, trichloroethylene, tetrachloroethylene and chlorobenzene; hydrocarbons, such as pentane, n-hexane, mixtures of hexane isomers, cyclohexane, heptane, octane, cleaner's naphtha, petroleum ether, benzene, ethyl benzene, toluene and xylenes, and ketones, such as acetone, methyl ethyl ketone and methyl isobutyl ketone, or mixtures of these solvents. The preferred solvent which is employed is toluene, tetrahydrofuran, acetone and chloroform.

Solvents are employed in the process of this invention in an amount of from 40 to 95 percent by weight, and more preferably from 75 to 90 percent by weight, based on the total weight of the reaction mass.

The temperatures and pressures used within the scope of the process of this invention can be the same as those used in the processes known heretofore for the addition of Si-bonded hydrogen to an aliphatic multiple bond in the presence of a catalyst. These are preferably temperatures between 0 and 200° C. and pressures between 900 and 1,100 hPa, and more preferably at temperatures of from 80 to 150° C. If desired, it is also possible to use higher or lower pressures.

In the process of this invention, the N,N'-dialkenyldiimide, the organosilicon compound containing two Si-bonded hydrogen atoms, the catalyst and, if appropriate, the solvent are mixed in any manner desired.

In the process of this invention for preparing poly-(imidesiloxanes), in addition to the N,N'-dialkenyldiimide, the organosilicon compound having two Si-bonded hydrogen atoms, the catalyst and, if appropriate, the solvent, the reaction mass can, of course, also contain additional substances such as, for example, agents which retard the addition of Si-bonded hydrogen to an aliphatic multiple bond, chain-limiting agents and crosslinking agents.

Examples of agents which retard the addition of Si-bonded hydrogen to an aliphatic multiple bond are benzotriazole and 2-methyl-3-butine-2-ole.

Examples of chain-limiting agents are compounds having one Si-bonded hydrogen atom, such as trimethyl-, triethyl- and diethylmethyl-silane, and compounds having one aliphatic carbon-carbon multiple bond, such as trimethylvinylsilane, triethylvinylsilane, styrene, allylbenzene and N-allylphthalimide.

Examples of crosslinking agents are trifunctional compounds, such as triallyl isocyanurate, glycerol triallyl ether, 1,3,5-triallylbenzyltricarboxylate and 1,3,5-triallylbenzene, and also polyfunctional compounds, such as linear or cyclic methylvinyl-(poly)-siloxanes or methylhydrogen-(poly)siloxanes which can also contain dimethylsiloxane units in addition to the methylvinylsiloxane or methylhydrogensiloxane units.

The process of this invention can be carried out continuously, semi-continuously and discontinuously.

After the completion of the reaction between an N,N'-dialkenyldiimide with an organosilicon compound containing two Si-bonded hydrogen atoms in the presence of a catalyst which promotes the addition of Si-bonded hydrogen to an aliphatic multiple bond, the reaction mass is worked up by processes known per se, such as, for example, distillation, filtration and precipitation. The poly-(imidesiloxanes) prepared according to this invention are obtained in a yield of, in general, over 85%, based on the N,N'-dialkenyldiimide and the organosilicon compound containing two Si-bonded hydrogen atoms, and is obtained, within the limit of detection, free of contamination of undesirable by-products.

The poly-(imidesiloxanes) prepared by the process of this invention preferably have an average molecular weight (weight average) of between 5,000 and 500,000, more preferably between 30,000 and 200,000. The amount of the organosilicon compound in the poly-(imidesiloxane) prepared in accordance with this invention is preferably between 25 and 90 percent by weight, and more preferably between 60 and 80 percent by weight.

The poly-(imidesiloxanes) prepared in accordance with this invention have a 9lass transition temperature which can be determined by differential thermal analysis and which, in general, is lower the higher the proportion of siloxane in the molecule. In addition, they are highly stable to heat.

The poly-(imidesiloxanes) prepared in accordance with this invention can be employed in all cases where poly-(imidesiloxanes) or polyimides have been employed heretofore. In particular, the poly-(imidesiloxanes) prepared by the process of this invention are suitable for coating semiconductor elements and as an insulation material for electrical conductors. Furthermore, they can be processed to give compression molding materials and molding materials and serve as a matrix material for composite materials and also for the production of films, sheeting and coatings for various end uses. The poly-(imidesiloxanes) prepared in accordance with this invention can also be employed as adhesives by employing them as an intermediate layer, for example between polyimides and a metallic or non-metallic substrate, and are suitable for use as a membrane for gas separation.

Other additives, such as pigments, fillers, processing aids and agents which stabilize against heat and light can be added to the poly-(imidesiloxane) prepared in accordance with this invention prior to its use.

In the following examples, all parts are parts by weight unless otherwise specified.

Determination of the average molecular weight $M_w$ and of the average degree of polymerization $P_w$ was carried out by means of gel permeation chromatography relative to a polystyrene standard by means of a high pressure liquid chromatograph using polystyrene gel columns and tetrahydrofuran as the mobile phase.

Measurement of inherent viscosities was carried out on an Ubbelohde capillary viscometer at a temperature of 25° C. in tetrahydrofuran at concentrations of C. = 0.2 g/dl. The inherent viscosity $n_{inh}$ is defined by the equation $n_{inh} = \ln n_{rel}/C.$, in which the relative viscosity $n_{rel}$ represents the quotient of the running time of the polymer solution and of the pure solvent in the capillary viscometer.

Thermal analytical measurements were carried out at a heating rate of 10°/minute. The glass transition point $T_G$ was taken from the 2nd crack of the differential thermal analysis (DTA) curve, and the decomposition temperature — 5% loss in weight under an atmosphere of nitrogen — was taken from the thermogravimetric (TG) curve.

EXAMPLE 1

(a) Preparation of N,N'-diallyl-1,4,5,8-naphthalenetetracarboxylic diimide

About 47.00 g (0.823 mol) of allylamine is added, with stirring at a temperature of 50° C, to a suspension of 100.00 g (0.373 mol) of 1,4,5,8-naphthalenetetracarboxylic anhydride (available commercially from Aldrich-Chemie GmbH & Co. KG, D-7924 Steinheim) in 650 ml of dimethylformamide, in which the temperature rises to about 80° C. The reaction mixture is heated to 145° C., stirred for an additional 3 hours at this temperature and allowed to cool to room temperature. The precipitated product is filtered off, washed with 50 ml of dimethylformamide and dried in vacuo at 130° C. Recrystallization is effected by dissolving in boiling toluene, filtering while hot and cooling the solution to 0° C. After filtration the solid is washed successively with 50 ml of toluene and 250 ml of n-pentane and is dried in vacuo at 80° C. This leaves 120.00 g (0.346 mol) of N,N-diallyl-1,4,5,8-naphthalenetetracarboxylic diimide in the form of a crystalline red-brown powder, which corresponds to a yield of 93%, having a melting point between 248 and 250° C.

In CDCl$_3$, N,N'-diallyl-1,4,5,8-naphthalenetetracarboxylic diimide exhibits signals in the 200 MHz-$^1$H-NMR spectrum at 4.78 (d, 4H), 5.27 (m, 4H), 5.97 (m, 2H) and 8.73 ppm (s, 4H).

(b) Preparation of dicyclopentadieneplatinum dichloride

Dicyclopentadieneplatinum dichloride (dicpPtCl$_2$), which is described in U.S. Pat. No. 4,276,252 (G. Kreis, Wacker-Chemie GmbH), is prepared by processes known from the literature [J. Chatt, L. M. Vallarino, L. M. Venanzi, J. Chem. Soc. (London) (1957) 2496–505 and H. C. Clark, L. E. Manzer, J. Organometal. Chem. 59 (1973) 411–28]. About 7.00 g (0.0169 mol) of K$_2$PtCl$_4$ are dissolved in 120 ml of water and then 90 ml of n-propanol, 11.50 g (0.0870 mol) of dicyclopentadiene and 60 mg of anhydrous SnCl$_2$ are added. The voluminous precipitate which has been deposited after stirring for two days at room temperature is filtered off and washed with water, a little ethanol and then n-hexane. The precipitate is dissolved in methylene dichloride and is then precipitated at a temperature of −80° C. by adding n-hexane. After filtration and drying, about 5.70 g (0.0143 mol) of dicpPtCl$_2$ in the form of a pale powder which, according to elementary analysis, contains 49.0 percent by weight of platinum is obtained. The yield, based on elementary platinum, is 85%.

In the infrared spectrum (KBr molding) dicpPtCl$_2$ exhibits significant bands at 310, 331, 630, 725, 813, 832, 851, 898, 920, 948, 996, 1170, 1218, 1241, 1269, 1299, 1333, 1423, 1452, 2881, 2980 and 3038 cm$^{-1}$.

(c) Preparation of α,ω-dihydrogendecamethylpentasiloxane

About 3 kg of α,ω-dihydroxydimethylpolysiloxane having a density of 0.97 g/cm$^3$ and an average molecular weight of 700,000 are dissolved, in increments and with stirring, in 1 kg of 1,3-dihydrogentetramethyldisiloxane (obtainable commercially under the name "HSi 2" from Wacker-Chemie GmbH, D-8000 Munich). About 26.8 ml of a solution of PNCl$_2$ (25 percent by weight in CHCl$_3$; obtainable commercially from Aldrich-Chemie GmbH & Co. KG, D-7924 Steinheim) are added, the mixture is stirred for two hours at a temperature of 22° C., during which time the viscosity of the mixture decreases, and then allowed to stand for 18 hours at a temperature of 22° C. The mixture thus obtained is vigorously stirred 6 times with 1 liter of distilled water each time and the aqueous phase is drawn off at the base each time. After being dried with 100 g of solid Na$_2$SO$_4$ and filtered, the equilibration product is subjected to fractional distillation. About 250 g of α,ω-dihydrogendecamethylpentasiloxane are obtained (0.4 hPa/52° C.).

Approximately 15.00 g (0.0433 mol) of the N,N'-diallyl-1,4,5,8-naphthalenetetracarboxylic diimide described in (a) above, and 15.50 g (0.0434 mol) of the α,ω-dihydrogendecamethylpentasiloxane described in (c) above, are mixed with 200 ml of toluene, and the mixture is heated to a temperature of 100° C. About 16 mg of the dicyclopentadieneplatinum dichloride described in (b) above, are added, during which time the reaction mixture foamed, and after the addition is complete, the mixture is stirred for an additional 2 hours at a temperature of 110° C. under reflux and the solvent is then distilled off. The red-brown, viscous residue is dried in vacuo at a temperature of 80° C. and is then dissolved in 100 ml of methylene dichloride. About 400 ml of petroleum ether having a boiling range of 50 to 75° C. are added to the solution thus obtained, and the mixture is stirred for one hour at a temperature of 22° C. When the poly-(imidesiloxane) prepared in accordance with the invention has settled out and the solvent has been decanted off, the polymer is dried in vacuo at a temperature of 50° C.

About 25.8 g of a red-brown, rubber-like polymer is obtained, which corresponds to a yield of 85%. The polymer has an average molecular weight $M_w$ of 75,000, an average degree of polymerization $P_w$ of 107, an inherent viscosity of 0.37 dl/g, a glass transition point $T_G$ of +45° C., a decomposition point of 460° C., and the following recurring unit:

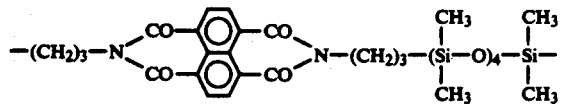

In the 200 MHz-$^1$H-NMR spectrum, in CD$_2$Cl$_2$, the poly-(imidesiloxane) prepared in accordance with the invention exhibits signals at 0.03 (s, 18H), 0.09 (s, 12H), 0.65 (m, 4H), 1.72 (m, 4H), 4.11 (t, 4H) and 8.65 ppm (s, 4H).

The resultant poly-(imidesiloxane) is dissolved in a little methylene dichloride and applied as a coating to a sheet of polytetrafluoroethylene (PTFE) by means of a doctor-blade made of brass, and then dried in vacuo at a temperature of 40° C. A transparent, red-brown polymer film is formed which has a thickness of 50 μm and is hard, slightly stretchable and is not tear resistant.

EXAMPLE 2 degree of polymerization $P_w$ of 118, an inherent viscosity of 0.42 dl/g, a glass transition point $T_G$ of +13° C. and a decomposition point of 450° C., and has the following recurring unit:

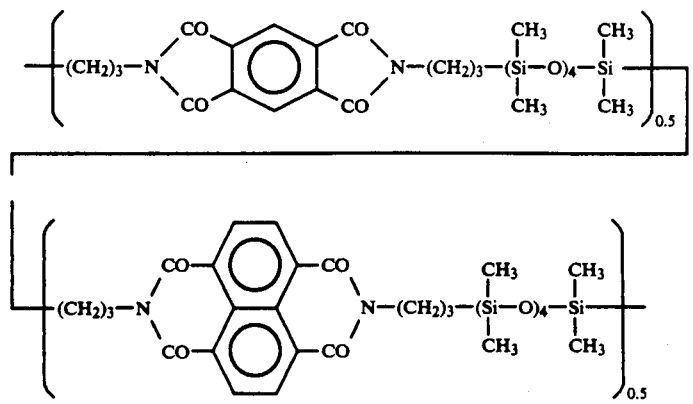

Preparation of N,N'-diallylpyromellitic diimide

N,N'-diallylpyromellitic diimide is prepared in accordance with U.S. Pat. No. 4,212,880 (M. H. Fisher, Merck & Co. Inc.). About 43.6 g (0.200 mol) of pyromellitic dianhydride (obtainable commercially from Riedel-de-Haen, D-3016 Seelze) are dissolved in 300 ml of dimethylformamide at a temperature of 22° C. About 27.5 g (0.482 mol) of allylamine are added slowly with stirring. During the addition of the allylamine, the mixture warms up to 70° C. The mixture is stirred, first under reflux for one hour, without heating, then for one hour at 95° C. and then for an additional 3 hours at 145° C. The greenish-brown solution is cooled to 3° C. and 150 ml of distilled water are added to precipitate the product. After being filtered off with suction, washed three times with 50 ml of distilled water in each case, then with a little methanol and dried at 50° C. in vacuo, about 45.8 g (0.155 mol) of residue which is identified as N,N'-diallylpyromellitic diimide in the form of white, glistening leaflets, having a melting point of 223° C., is recovered. This corresponds to a yield of about 77%.

In the 200 MHz-$^1$H-NMR spectrum, in CDCl$_3$, N,N'-diallylpyromellitic diimide exhibits signals at 4.36 (d, 4H), 5.30 (m, 4H), 5.90 (m, 2H) and 8.32 ppm (s, 2H).

About 5.00 g (0.0169 mol) of the N,N'-diallylpyromellitic diimide prepared above, 5.85 g (0.0169 mol) of the N,N'-diallyl-1,4,5,8-naphthalenetetracarboxylic diimide prepared in Example 1 (a) and 12.06 g (0.0338 mol) of the α,ω-dihydrogendecamethylpentasiloxane prepared in Example 1 (c) are mixed with 200 ml of toluene and heated to a temperature of 110° C. When 20 mg of the dicyclopentadieneplatinum dichloride prepared in Example 1 (b) have been added, the mixture is stirred under reflux for an additional hour at a temperature of 110° C., and the solvent is then distilled off. The red-brown, rubber-like residue is dissolved in 100 ml of methylene dichloride and added dropwise with stirring over a period of one hour to 1 liter of n-hexane which has been cooled to a temperature of −30° C. The precipitated poly-(imidesiloxane) is separated from the liquid phase by decantation, washed with n-hexane and dried in vacuo at a temperature of 50° C.

About 22.00 g of a red-brown, rubber-like polymer is recovered, which corresponds to a yield of 96%. It has an average molecular weight $M_w$ of 80,000, an average degree of polymerization $P_w$ of 118, an inherent viscosity of 0.42 dl/g, a glass transition point $T_G$ of +13° C. and a decomposition point of 450° C., and has the following recurring unit:

In the 200 MHz-$^1$H-NMR spectrum, in CD$_2$Cl$_2$, the poly-(imidesiloxane) prepared in accordance with the invention exhibits signals at 0.02 (s, 18H), 0.07 (s, 6H), 0.08 (s, 6H), 0.59 (m, 4H), 1.70 (m, 4H), 3.70 (t, 2H), 4.27 (t, 2H), 8.23 (s, 1H) and 8.72 ppm (s, 2H).

The resultant poly-(imidesiloxane) is applied as a coating to a sheet of polytetrafluoroethylene in accordance with the procedure described in Example (1). A transparent, red-brown polymer film is formed which has a thickness of 70 μm and is elastic and tear resistant.

EXAMPLE 3

Preparation of α,ω-dihydroqeneicosamethyldecasiloxane

Fractional distillation of the equilibration product prepared in Example 1 (c) above, gives 104 g of α,ω-dihydrogeneicosamethyldecasiloxane (0.5 hPa/115° C.).

About 10.00 g (0.0289 mol) of the N,N'-diallyl-1,4,5,8-naphthalenetetracarboxylic diimide prepared in Example 1 (a) above, 4.60 g (0.0155 mol) of the N,N'-diallylpyromellitic diimide prepared in Example 2 and 32.30 g (0.0444 mol) of the α,ω-dihydrogeneicosamethyldecasiloxane described above are mixed with 350 ml of toluene and heated to a temperature of 110° C. When 35 mg of the dicyclopentadieneplatinum dichloride prepared in Example 1 (b) above have been added, the mixture is stirred under reflux for an additional 2 hours at a temperature of 110° C., and the solvent is then distilled off. The red-brown, viscous residue is dissolved in 100 ml of methylene dichloride. About 1 liter of gasoline having a boiling range of 100 to 140° C. is added to the solution thus obtained, and the mixture is stirred for 2 hours at a temperature of 22° C. and subsequently concentrated to a volume of 500 ml. The precipitated poly-(imidesiloxane) is separated from the liquid phase by decantation, washed with gasoline and dried in vacuo at a temperature of 50° C.

About 39.9 g of a pale brown, rubber-like polymer are recovered which corresponds to a yield of 85%, which has an average molecular weight $M_w$ of 85,000, an average degree of polymerization $P_w$ of 81, an inherent viscosity of 0.30 dl/g, a glass transition point $T_G$ of −5° C. and a decomposition point of 430° C., and has the following recurring unit:

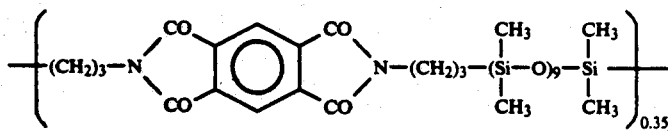

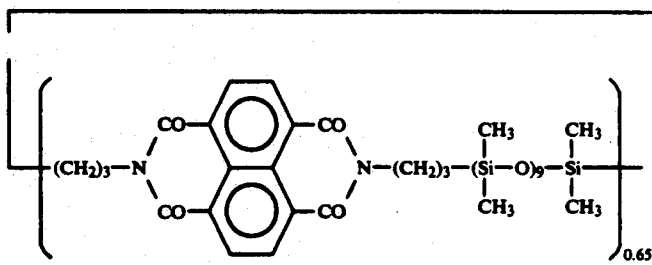

In the 200 MHz-$^1$H-NMR spectrum, in $CD_2Cl_2$, the poly-(imidesiloxane) prepared in accordance with the invention exhibits signals at 0.07 (s, 48H), 0.08 (s, 4.2H), 0.09 (s, 7.8H), 0.65 (m, 4H), 1.74 (m, 4H), 3.71 (t, 1.4H), 4.15 (t, 2.6H), 8.22 (s, 0.7H) and 8.71 ppm (s, 2.6H).

The resultant poly-(imidesiloxane) is applied as a coating to a sheet of Polytetrafluoroethylene in accordance with the procedure described Example (1). A transparent, red-brown polymer film is formed which has a thickness of 100 μm and is tear resistant and stretchable to a certain degree.

EXAMPLE 4

Preparation of N,N'-diallyl-3,3',4,4'-benzophenonetetracarboxylic diimide

N,N'-diallyl-3,3',4,4'-benzophenonetetracarboxylic diimide is prepared in accordance with the procedure described in the preparation of N,N'-diallylpyromellitic diimide in Example (2). About 150 g (0.446 mol) of 3,3',4,4'-benzophenonetetracarboxylic dianhydride (obtainable commercially from Aldrich-Chemie GmbH & Co. KG, D-7924 Steinheim) are added to 400 ml of dimethylformamide at a temperature of 22° C., and 61.1 g (1.070 mol) of allylamine are added slowly, with stirring. During the period of addition, the mixture warms up to 85° C. The clear brown solution is vigorously stirred under reflux for 3 hours at 140° C. and cooled to 22° C., when the product is precipitated as a yellow solid. After being filtered, washed with 50 ml of dimethylformamide and 50 ml of methanol and dried at 40° C. in vacuo, the crude product is purified by being dissolved in 600 ml of toluene and precipitated with 200 ml of n-heptane at 0° C., filtered, washed with 100 ml of n-hexane and 200 ml of diethyl ether and dried in vacuo at 40° C. About 112 g (0.280 mol) of N,N'-diallyl-3,3',4,4'-benzophenonetetracarboxylic diimide are recovered in the form of a yellow powder having a melting point between 160° and 163° C., which corresponds to a yield of 60%.

In the 200 MHz-1H-NMR spectrum, in $CDCl_3$, N,N'-diallyl-3,3',4,4'-benzophenonetetracarboxylic diimide exhibits signals at 4.35 (d, 4H), 5.27 (m, 4H), 5.89 (m, 2H) and 8.12 ppm (m, 6H).

About 10.00 g (0.025 mol) of the N,N'-diallyl3,3',4,4'-benzophenonetetracarboxylic diimide prepared above and 8.90 g (0.025 mol) of the α,ω-dihydrogendecamethylpentasiloxane prepared in Example 1 (c) are mixed with 100 ml of toluene and heated to a temperature of 100° C. When 7 mg of the dicyclopentadieneplatinum dichloride described in Example 1 (b) have been added, the mixture is stirred under reflux for an additional 1.5 hours at a temperature of 110° C., and the solvent is then distilled off. The yellow, rubber-like residue is dried in vacuo at a temperature of 40° C. and dissolved in 100 ml of methylene dichloride. About 700 ml of n-pentane are added to the solution thus obtained, and the mixture is stirred for 2 hours at a temperature of 22° C. The precipitated poly-(imidesiloxane) is separated from the liquid phase by decantation, washed with n-pentane and dried in vacuo at a temperature of 50° C.

About 17.4 g of a yellow, rubber-like polymer are recovered which corresponds to a yield of 92%, which has an average molecular weight $M_w$ of 150,000, an average degree of polymerization $P_w$ of 198, an inherent viscosity of 0.56 dl/g, a glass transition temperature $T_G$ of +28° C. and a decomposition point of 470° C., and has the following recurring unit:

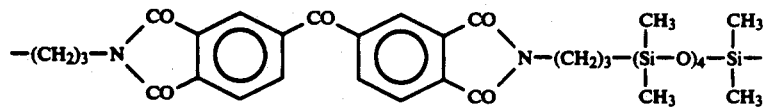

In the 200 MHz-$^1$H-NMR spectrum, in $CD_2Cl_2$, the poly-(imidesiloxane) prepared in accordance with the invention exhibits signals at 0.03 (s, 18H), 0.07 (s, 12H), 0.56 (m, 4H), 1.68 (m, 4H), 3.68 (t, 4H) and 8.08 ppm (m, 6H).

The resultant poly-(imidesiloxane) is applied as a coating to a sheet of polytetrafluoroethylene in accordance with the procedure described in Example (1). A transparent, pale yellow polymer film is formed, which has a thickness of 90 μm and is stretchable but hardly elastic.

What is claimed is:

1. A process for preparing poly-(imidesiloxanes) which comprises reacting an N,N'-dialkenyldiimide with an organosilicon compound containing two Si-bonded hydrogen atoms in the presence of a catalyst which promotes the addition of Si-bonded hydrogen to an aliphatic multiple bond.

2. The process of claim 1, wherein the N,N'-dialkenyldiimide has the formula

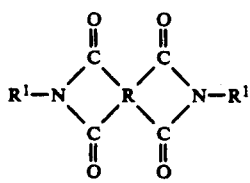

in which R is a tetravalent organic radical free from aliphatic multiple bonds and $R^1$ is a monovalent organic radical having an aliphatic carbon-carbon double bond.

3. The process of claim 1, wherein the N,N'-dialkenyldiimide is selected from the group consisting of N,N'-diallylpyromellitic diimide, N,N'-diallyl-3,3',4,4'-benzophenonetetracarboxylic diimide and N,N'-diallyl1,4,5,8-naphthalenetetracarboxylic diimide.

4. The process of claim 1, wherein the organosilicon compound has units of the general formula

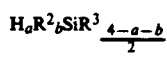 (IV)

in which $R^2$ is selected from the group consisting of monovalent SiC-bonded organic radicals which are free from an aliphatic multiple bond, and substituted monovalent SiC-bonded organic radicals which are free from an aliphatic multiple bond, $R^3$ is selected from the group consisting of an oxygen atom, divalent SiC-bonded organic radicals which are free from an aliphatic multiple bond and divalent substituted SiC-bonded organic radicals which are free from an aliphatic multiple bond, and a is 0, 1 or 2, b is 0, 1, 2 or 3 and the sum of a and b is less than or equal to 3.

5. The process of claim 1, wherein the organosilicon compound having two Si-bonded hydrogen atoms is an $\alpha,\omega$-dihydrogendimethyl(poly)siloxane having from 3 to 20 silicon atoms per molecule.

6. The process of claim 4, wherein the organosilicon compound having two Si-bonded hydrogen atoms is an $\alpha,\omega$-dihydrogendimethyl(poly)siloxane having from 3 to 20 silicon atoms per molecule.

7. The process of claim 1, wherein the molar ratio of N,N'-dialkenyldiimide to organosilicon compound having two Si-bonded hydrogen atoms is between 1:0.7 and 1:1.3.

8. The process of claim 1, wherein the reaction is carried out in the presence of a solvent which is inert with respect to the reactants and the reaction product.

9. The process of claim 1, wherein the reaction is carried out at temperatures between 0° C. and 200° C.

10. The process of claim 1, wherein the reaction is carried out under a pressure between 900 and 1,100 hPa.

11. A process for coating a substrate which comprises applying a solution of the poly-(imidesiloxane) obtained from the process of claim 1 to a substrate and thereafter drying the coated substrate.

12. Sheeting material which is prepared from the poly-(imidesiloxanes) obtained in accordance with the process of claim 1.

13. A gas separation membrane which is prepared from the poly-(imidesiloxanes) obtained in accordance with the process of claim 1.

* * * * *